April 17, 1928.　　　　　J. F. McMURTRIE　　　　　1,666,104
STEERING GEAR FOR MOTOR VEHICLES
Filed April 24, 1926　　　3 Sheets-Sheet 1
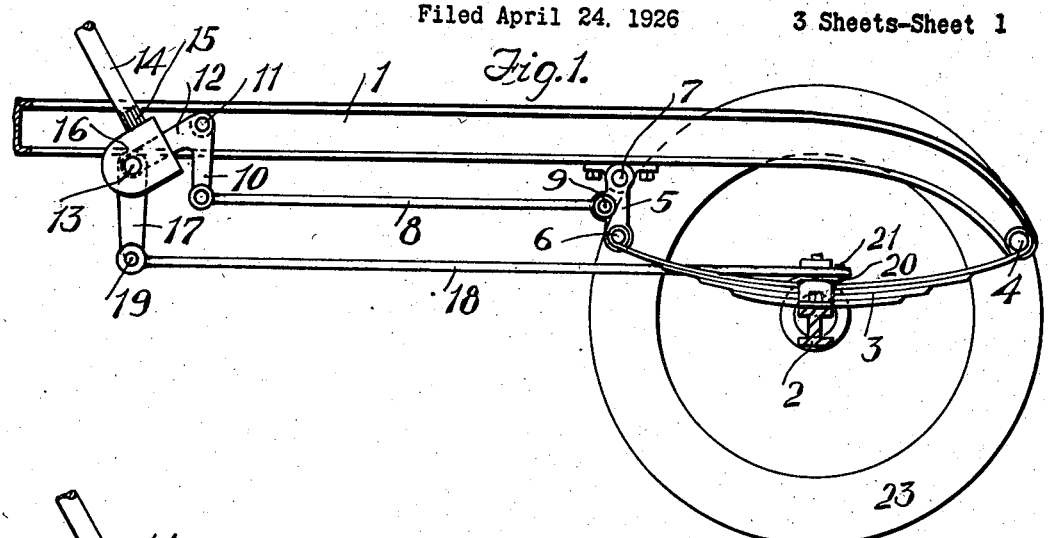
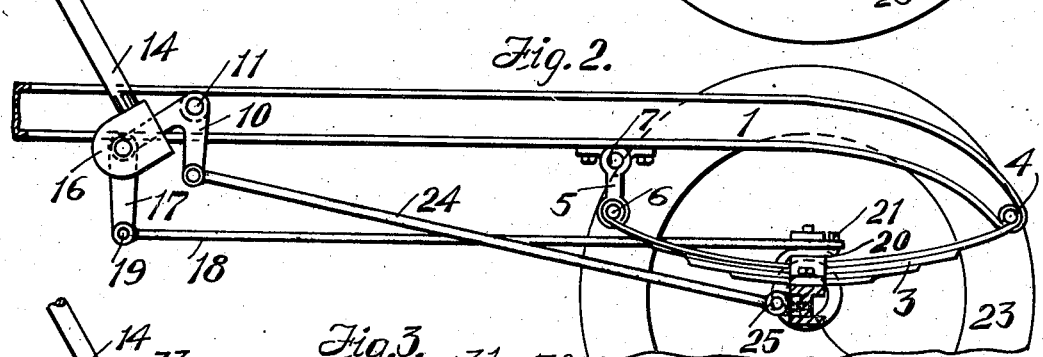
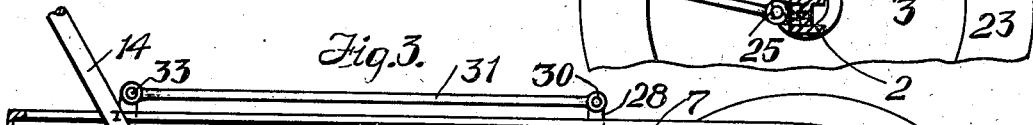
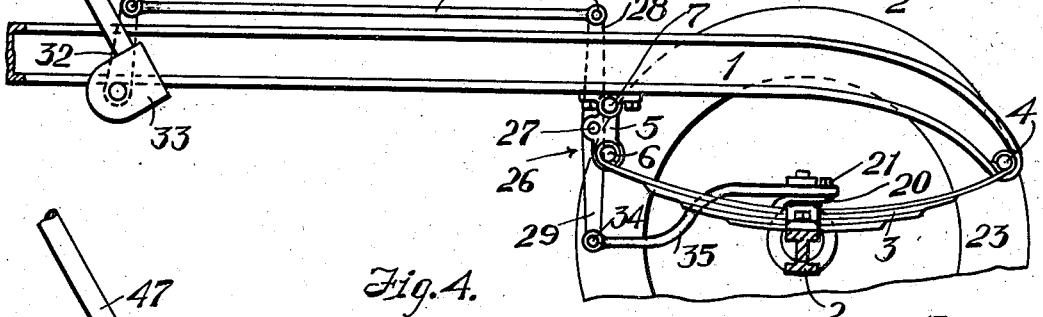
INVENTOR.
John F. McMurtrie.
BY
Harry W. Bown.
ATTORNEY.

April 17, 1928.

J. F. McMURTRIE 1,666,104

STEERING GEAR FOR MOTOR VEHICLES

Filed April 24, 1926

INVENTOR.
John F. McMurtrie.

BY
Harry W. Bowen.
ATTORNEY.

April 17, 1928.  1,666,104
J. F. McMURTRIE
STEERING GEAR FOR MOTOR VEHICLES
Filed April 24, 1926  3 Sheets-Sheet 3
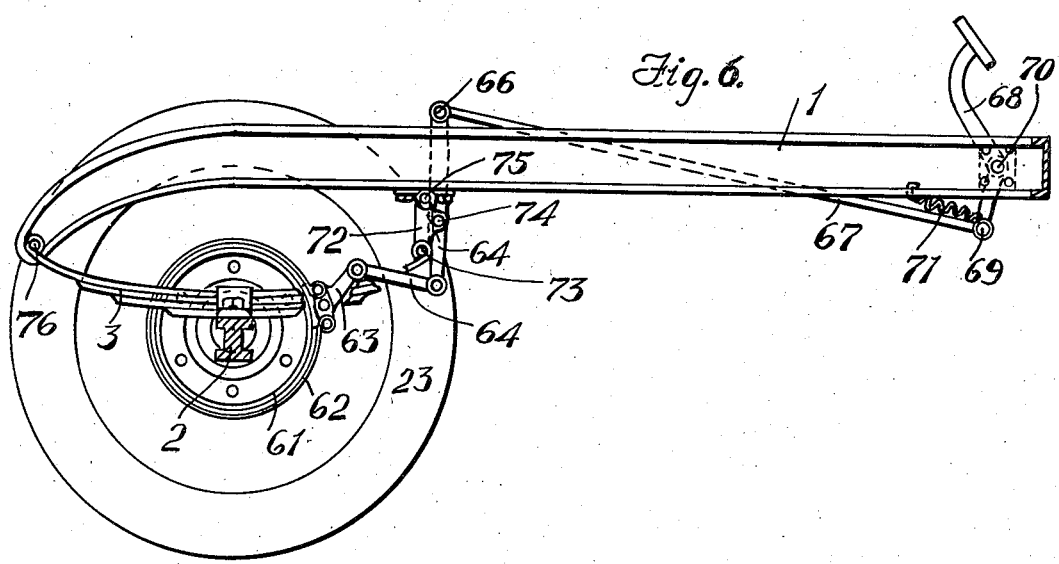
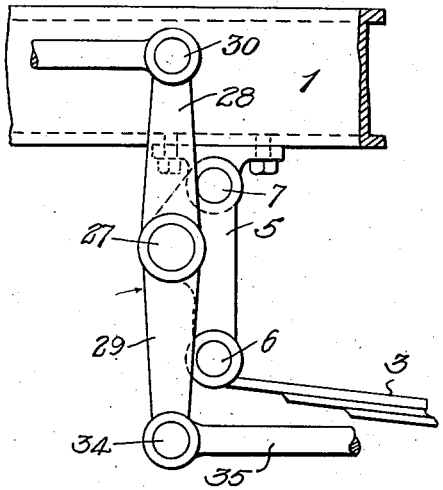
INVENTOR.
John F. McMurtrie.
BY
Harry W. Bourn.
ATTORNEY.

Patented Apr. 17, 1928.

1,666,104

UNITED STATES PATENT OFFICE.

JOHN F. McMURTRIE, OF SPRINGFIELD, MASSACHUSETTS, ASSIGNOR OF ONE-HALF TO WILLIAM W. HOPKINS, OF SPRINGFIELD, MASSACHUSETTS.

STEERING GEAR FOR MOTOR VEHICLES.

Application filed April 24, 1926. Serial No. 104,339.

This invention relates to improvements in compensating steering gear for motor vehicles. An object of the invention is to constantly maintain the forward or steering wheels of a motor vehicle in a straight line. It is a well known fact that when the forward wheels, or one of them passes over an obstruction in the roadway, either an elevation or depression, that the forward axle moves relative to the body of the vehicle both vertically and longitudinally. The resulting effect of this movement is that the wheels do not maintain a straight course. This uneven movement is sometimes termed wabbling or shimmying resulting in an uneven wearing of the tires and often is transmitted to the steering wheel. It is due to the bending or flexure of the forward springs. When the springs are compressed in passing over an elevation the resulting effect is to move the forward axle rearwardly as will be fully described.

The present usual spring and front axle construction is to fixedly secure the forward end of the spring to the forward end of the side frame of the chassis. The rear end of the spring is attached to a shackle or swinging lever. This construction therefore permits the rear end of the spring when flexed to move either forward or backward and consequently a forward or backward movement is imparted to the axle which results in the wabbling or shimmying of the wheels.

The present invention embodies two general forms: one, in which levers and links are attached to the swinging shackle lever to which the rear end of the forward spring is attached and to the steering box. The other, to the forward axle and steering box. Another form consists in attaching a supplemental lever to the swinging shackle lever. This supplemental lever has two arms which are of equal length. Attached to the end of the lower arm of this lever is a link that extends forward to the kunckle arm, and, attached to the upper end of the upper arm of this lever is a link that extends rearwardly to the steering box lever. When the forward spring is flexed it has been found that the distance through which the rear end of the spring travels which is attached to the shackle lever, is practically twice the distance that the axle moves rearwardly. This movement therefore provides a means for locating a point of attachment for the supplemental lever on the shackle lever which point would move only one-half of the travel of the axle. By means of this system of levers and links a compensating movement is imparted to the front axle and steering knuckle arm which causes the wheels to move forward in a straight line. In order to fully illustrate the invention the drawings show the structure in full lines, and, in diagrams corresponding to the different figures is shown the movements of the axle, the shackle lever, and the compensating lever. The invention is capable of different modifications which will be described.

The invention broadly embodies the principles of making use of the movements of the forward springs, through the use of links and levers to impart motion to the steering box which will constantly maintain the same distance between the front axle and the steering box, whereby a compensating arrangement is produced which will have no tendency to change the direction of the front wheels when in motion. The present steering mechanism compensates for the variation in distance between the steering box and the front axle, which variation results in the wabbling or shimmying effect of the front wheels.

Referring to the drawings.

Figure 1A:
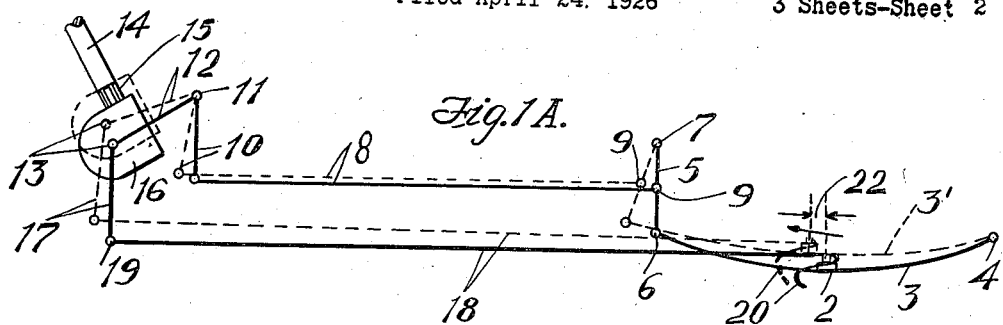
Fig. 1 is a side elevational view in which the compensating levers are directly attached to the swinging shackle lever and knuckle arm.

Fig. 1ᴬ is a view showing diagrammatically the movements of the construction shown in Fig. 1.

Figure 2A:
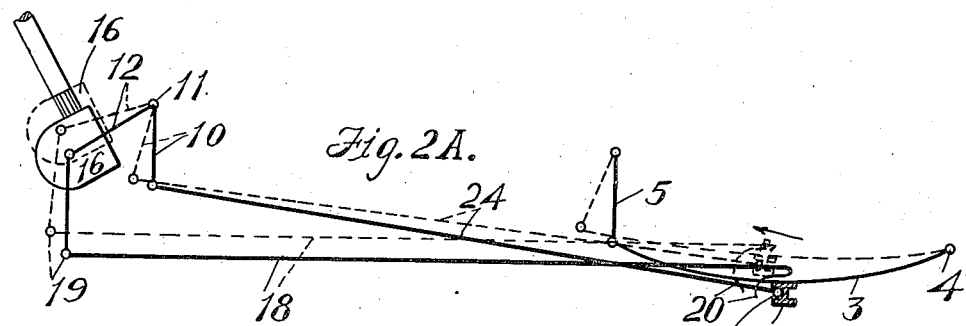
Fig. 2 is a modification in which the compensating lever is directly attached to the axle instead of to the shackle lever and the end of this lever is connected to the movable steering box through a bell crank lever.

Fig. 2ᴬ is a view showing diagrammatically the movements of the construction shown in Fig. 2.

Figure 3A:
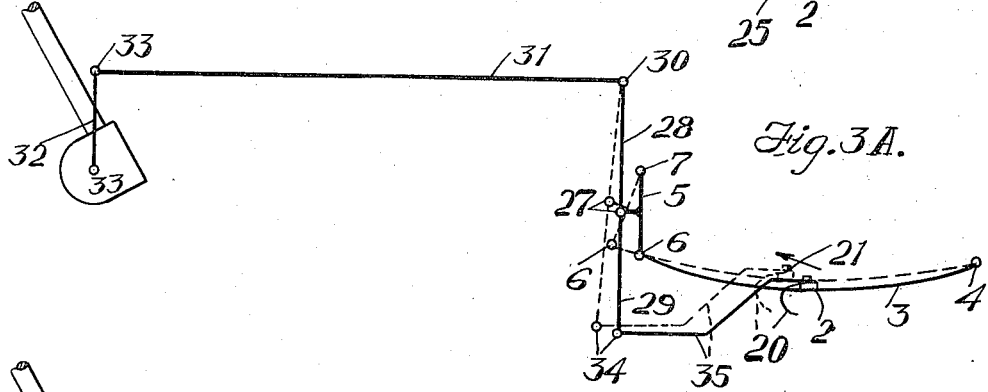
Fig. 3 is a further modification in which the compensating levers are attached to the shackle lever through a supplemental lever which is attached to the shackle lever.

Fig. 3^A is a view showing diagrammatically the movements of the structure shown in Fig. 3.

Figure 4A:
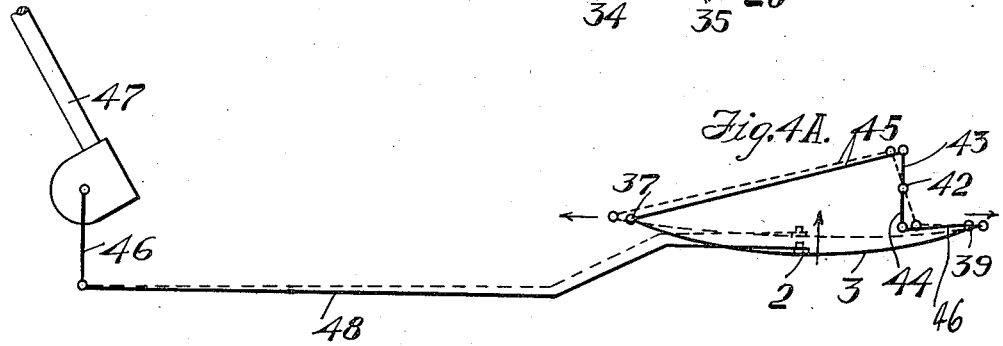
Fig. 4 is a further modification in which the two opposite ends of the forward springs are slidably mounted in the chassis frame work.

Fig. 4^A is a view showing diagrammatically the movement of the structure shown in Fig. 4.

Fig. 5 is an enlarged view of the compensating lever mechanism of Fig. 3, and

Fig. 6 is a further modification.

Referring to the drawings in detail:

1 designates the forward end of one of the side frames of the chassis, 2 the forward axle on which is mounted the semielliptical spring 3. 4 the pivotal connection at the forward end of the spring 3 with the side frame piece 1. 5 designates the pivotal shackle hanger to which the rear end of the spring 3 is pivotally connected at 6. 7 the pivotal attachment of the shackle lever 5 with the frame 1. 8 is a link which is connected to the shackle lever 5 at the point 9. Its other end is pivotally attached to the arm 10 of the bell crank which is pivotally attached to the side frame 1 at 11; its other arm 12 is pivotally attached to the movable steering box at 13. 14 is the steering post which has a slidable spline connection at 15 with the steering box 16. The usual steering arm is indicated at 17, and the usual drag or radius rod at 18 which is pivotally connected to the steering arm at 19 and to the knuckle arm 20 at 21. The point 9 of attachment of the link 8 to the shackle lever 5 is such that this point moves through an arc that is practically one half of the length of the arc through which the point 6 travels. In other words the length of the arc through which the point 6 travels is equal to the distance that the axle 2 moves rearward or forward as indicated by the space 22 between the dotted lines. This space is the distance the axle 2 moves rearward when the spring 3 assumes the dotted line position 3' since the spring is then shortened by that distance. When the point 9 and link 8 move towards the left hand, as shown by the dotted lines in Fig. 1^A, the bell crank arms 10 and 12 turn about the pivotal point 11 as shown. This causes the slidable steering box 16 to be raised. In doing so, the steering arm 17 draws the drag rod 18 upward and rearward thus automatically maintaining a fixed distance between the pivotal point 13 of the steering box 16 and the axle 2. Or, in other words there is a compensating or equalization of the forward and rearward movements of the axle 2 through the flexing movements of the spring 3, shackle lever 5, link 8, bell crank lever to the steering box, which constantly maintains the distance between the steering box and the axle constant, whereby the wheels are prevented from assuming a direction other than a straight line when the vehicle is in motion. Since the length of the arc of the point 9 is the same as the travel of the axle 2 it is clear that the wheels will not be given a sidewise motion as would be the case if there was a rigid connection between the steering box and the axle 2.

In Fig. 2 the link 24 is not attached to the shackle lever 5 but to the axle 2 as indicated at 25. In this construction the rearward and forward longitudinal movement of the axle 2 will through the link 24, bell crank arms 10 and 12, slidable steering box 16, neutralize any tendency of the wheels 23 to be thrown out of a straight line since the movements of the axle are transmitted to the slidable steering box.

Referring to Figs. 3, and 3^A and 5, the shackle link 5 has pivotally attached thereto the supplemental lever 26 at the point 27. This lever is formed with the arms 28 and 29 which are of equal length. Attached to the upper end of the arm 28 at 30, is a link 31, its opposite end is pivotally attached to the steering arm 32 at 33 of the steering box 33. Attached to the lower end of the arm 29 at 34 is the drag link 35. The point 27 as before stated, moves through an arc which is equal to the forward and rear movements of the axle 2 when the spring 3 is flexed either upward or downward.

The movements of the spring therefore serves to rock the lever 26 about the stationary point 30 and operates to compensate for the motions of the axle 2 since the point 34 is always the same distance from the axle 2. The steering of the wheels is effected through the steering arm 32, link 31, lever 26, link 35 as usual. The distance between the main steering post 14 and the axle 2 is thus a constant one, as the spring vibrates up and down. This construction I consider as the preferred one.

Referring to Figs. 4 and 4^A the spring 3 is slidably connected to the slotted plate 36 at 37 and to the slotted end 38 at 39. A plate 40 is secured to the frame piece 1, a two arm lever 41 is pivotally connected to the plate 40 at 42. Pivotally attached to the arms 43 and 44 are the links 45 and 46 which links, as shown, are attached at their opposite ends to the slidable pivot pins 37 and 39. The usual steering arm is shown at 47 and drag rod at 48. In operation the axle 2 will simply move up and down and the drag rod 48 will turn about its connection with the arm 46. The two arm lever 41 will permit the two ends of the spring to move equally, thus controlling the vertical movements of the axle 2 and prevent wabbling or shimmying of the steering wheels.

It is also to be understood that equivalent mechanical connections as cams, gears, cables or toggles may be substituted for the link and lever connections shown in the drawings, for obtaining the neutralizing compensating or equalizing movements of the steering gear.

Referring to the construction shown in Fig. 6 which is for the purpose of imparting a uniform pressure to the brake band, especially when brakes are located on the front wheels. 61 designates the brake drum; 62 the externally contracting brake band. 63 the lever arm to which the ends of the band 62 are attached in the usual manner 64 is a link connecting the lever arm 63 and the lower end of the double arm lever 65.

The opposite end of the lever 65 is pivotally connected at 66 to the link 67 which link is connected to the foot pedal 68 at 69. This pedal is pivotally connected to the frame 1 at 70. The usual spring 71 is employed to retain the parts in their normal or inoperative positions. The free end of the spring 3 is pivotally connected to the supplemental lever 72 at 73, whch lever is pivotally connected to the lever 65 at 74 and to the main frame 1 at 75. The other end of the spring is connected as before to the frame 1 at 76.

The operation may be described as follows: When the axle 2 rises and falls the free end of the spring moves the lever 65 back and forth about the pivot pin 75 which in turn operates to cause the axle 2 to rise and fall in a vertical plane and therefore maintain the distance constant between the foot pedal and the brake bands whereby a uniform breaking pressure would be applied to the brake drum. It is a well known fact that an uneven brake pressure is now applied to the brake drum due to the constant variation in distance between the foot pedal and brake band and axle. This construction is especially applicable to brakes on the front wheels.

What I claim is:

1. In a steering mechanism for motor vehicles, the combination with the forward axle of the chassis frame, and the forward spring which is located between the said axle and the chassis frame, of a shackle lever pivotally attached to the chassis frame at one end and to the other end of which lever the rear end of the said spring is pivotally attached, the forward end of the spring being attached to the chassis frame, a steering box attached to the chassis frame, a two arm lever which is pivotally secured to the shackle lever, a link connection from one end of the two arm lever to the steering knuckle of the vehicle, and a link interposed between the other end of the two arm lever and the steering box, whereby the compression and deflection of the spring will automatically maintain the distance constant between the steering box and the axle.

2. In a steering mechanism for motor vehicles the combination with the forward axle of the chassis, a spring on the axle, a steering box attached to the chassis part of the vehicle, a steering knuckle arm pivotally mounted on the said axle, a shackle lever pivotally attached to the chassis part and to which the rear end of the springs on the said axle is pivotally connected, the forward end of the spring being pivotally attached to the chassis part, a lever pivotally mounted on the shackle lever having oppositely extending arms, one end of the lever on the shackle, being connected to the steering knuckle and its other end to the steering box, whereby the vertical movements of the spring will be automatically transmitted to the steering knuckle arm and operate to maintain the distance between the steering box and the axle constant and prevent a wabbling or wavy movement of the direction of the wheel when the vehicle is in motion.

3. A steering mechanism for motor vehicles comprising in combination with the forward axle, a knuckle steering arm on the forward axle, a spring secured to the forward axle and to the chassis of the vehicle, a shackle lever which is pivotally connected to the chassis and to one end of the spring, a supplemental lever pivotally mounted on the shackle lever and having arms of equal length, a link connecting one arm of the supplemental lever with the steering box lever and a link connecting the other arm of the supplemental lever with the knuckle steering arm, whereby flexure of the spring will automatically maintain the distance between the steering knuckle arm and the steering box lever in a constant position for preventing wabbling or shimmying of the steering wheel.

4. A compensating device for the steering wheels of a motor vehicle to prevent wabbling comprising in combination with the forward axle, a spring secured to the axle, a shackle lever pivotally secured to the chassis and to which one end of the spring is attached, a supplemental lever pivotally attached to the shackle lever at a point that moves through an arc that is equal to the backward and forward movement of the axle when the spring is flexed, a link attached to one end of the supplemental lever and to a steering lever of the steering box and a drag lever attached to the other end of the supplemental lever and to the steering knuckle arm whereby the flexure of the spring serves to compensate for the change in position of the axle.

5. In a steering mechanism for motor vehicles, the combination with the forward axle, the chassis frame, and the steering box. a steering lever on the steering box, a spring secured to the forward axle and to the chassis frame at one end, a shackle lever which is pivotally connected to the chassis and to which the opposite end of the spring is pivotally connected, a link interposed between the shackle lever and the steering lever of the steering box and an operative connection between the shackle lever and the steering knuckle.

6. A steering mechanism for motor vehicles comprising in combination with the steering post, the steering box, and springs located between the front axle and the chassis frame of a motor vehicle, a shackle lever to which one end of the spring is attached, said shackle lever being pivotally secured to the chassis frame, a steering lever on the steering box, link mechanism between the spring shackle lever, front axle and the said lever of the steering box, the construction and arrangement being such that vertical movements of the spring will be automatically neutralized and the variation in the wheel base of the motor vehicle is automatically neutralized whereby the forward wheels will move in a straight line as described.

7. A steering mechanism for motor vehicles comprising in combination, with the forward axle of the chassis of a motor vehicle, wheel steering knuckles on said axle, a steering box and its steering lever on the chassis, a spring secured to the forward axle and having one end secured to the chassis frame, a shackle lever pivotally secured to the chassis frame and to one end of which the other or rear end of the said spring is connected, link connecting mechanism between the shackle lever, the steering lever of the steering box and the wheel knuckle steering arm, on the axle whereby the flexure of the spring will operate the shackle lever and link connecting mechanism and prevent the vertical flexure of the spring from imparting a wabbling or uneven steering motion to the wheels.

8. In combination with the chassis of a motor vehicle having front and rear axles, a spring having one end pivotally attached to the chassis, an axle having the center part of the spring secured thereto, wheel steering knuckles on the axle, a steering box, a steering lever, shackle means on the chassis to which the other end of the spring is connected, for permitting the spring to elongate at its opposite end, link devices connected to the elongating end of the spring, to the wheel steering knuckles and to the steering lever for transmitting the flexure or elongating movements of the spring to said knuckles for neutralizing or compensating the flexing movements of the spring for maintaining a constant relation between the movable and fixed parts of the chassis, as described.

JOHN F. McMURTRIE.